3,000,784
PHENOTHIAZINE AND WHEAT MIDDLING COMPOSITIONS
Arlie C. Todd, Shorewood Hills, Wis., assignor to Wisconsin Alumni Research Foundation, Madison, Wis., a corporation of Wisconsin
No Drawing. Filed Nov. 22, 1957, Ser. No. 698,047
2 Claims. (Cl. 167—53)

The present invention relates to novel compositions of matter and more particularly to improved compositions having special utility in the anthelmintic field.

The use of phenothiazine for the control of parasites of animals and particularly as an anthelmintic for cattle, sheep, etc. has been known for many years. See Foster, A.O., U.S.D.A. Bull. pp. 1-2, Oct. 1943; Eveleth et al.: Vet. Medicine, pp. 90–96 (1945); and Milks: Veterinary Pharmacology, Materia Medica and Therapeutics, 6th Ed., pp. 334–337 (1949). While the oral administration of phenothiazine as shown by the above illustrative publications has been demonstrated to be effective in farm animals, one of the primary problems, due to the extremely unpleasant taste of phenothiazine, has been to find a phenothiazine-containing composition acceptable to the animals. When mixed with feed rations, for example, the animals frequently eat very little or refuse to eat. This throws the animal off its diet and is objectionable with dairy as well as meat producing animals who are deleteriously affected unless kept on feed.

In attempts to overcome this problem phenothiazine has been administered in capsules, stomach tubes, syringes and the like. These methods of administration still proved objectionable particularly to ruminants and also the farmer as they are somewhat involved and are not as readily accomplished or as convenient as by feeding. As a result phenothiazine has also been administered in milk, in aqueous flour suspensions and in molasses diluted with water and also admixed with salt (NaCl). They have all proven objectionable to the animal and their administration in proper dosage has frequently been difficult and to result in material losses to the farmer.

In the search for a phenothiazine composition acceptable to the animal, I discovered that compositions containing phenothiazine in combination with wheat middlings or equivalent grain middlings were much more readily acceptable to the animal than any of the compositions available heretofore. With further investigations, I discovered that the phenothiazine-wheat middling combination could be improved by the addition of molasses and that a product highly preferred by ruminants (e.g. sheep and cattle including young dairy stock and beef stock) could be prepared by combining the phenothiazine-wheat middling-molasses combination with salt.

The following examples will serve to illustrate the invention.

*Example I*

| | Lbs. |
|---|---|
| Phenothiazine | 100 |
| Wheat middlings | 50 |
| Molasses (dry) | 50 |
| Salt | 900 |

The phenothiazine is first mixed with the wheat middlings and the molasses and the resulting mixture then thoroughly mixed with the salt. This mixture contains 1 part by weight of phenothiazine, 0.5 part by weight of wheat middlings, 0.5 part by weight of molasses and 9 parts by weight of salt.

*Example II*

| | Lbs. |
|---|---|
| Phenothiazine | 100 |
| Wheat middlings-molasses | 100 |
| Salt | 900 |

The wheat middling-molasses product is first made by drying a mixture containing 40% wheat middlings and 60% molasses (containing about 24% water) at a temperature of about 60 to 90° C. One hundred pounds of the resulting dry mixture containing about 55 pounds of wheat middlings and about 45 pounds of molasses solids is then mixed with the phenothiazine and the resulting mixture finally mixed with the salt. This mixture provides about 1 part of phenothiazine to 1 part of the wheat middlings-molasses mixture to 9 parts of salt.

*Example III*

This example is in accordance with Examples I and II except that the salt is omitted. It provides a mixture made up of 1 part by weight of phenothiazine to 1 part by weight of the wheat middling-molasses mixture containing about 45–55% by weight of wheat middlings and about 45–55% molasses. For administration 1 part by weight of this mixture is preferably mixed with about 3–100 parts by weight of feed rations of the type available and normally fed to sheep and cattle. It can also be mixed with salt as in Examples I and II.

In feed mixtures or concentrates, administration of about one pound per day of a mixture made up of about one pound of the above 1:1 phenothiazine-middling molasses mixture and three pounds of feed provides a daily dose of about 60 grams of phenothiazine which is adequate for curative treatment. Administration of about one pound per day of a feed mixture made up of about one pound of the above 1:1 phenothiazine-middling molasses mixture and one hundred pounds of feed provides a daily dose of about 2 grams of phenothiazine which is adequate for low level preventative treatment. The feed can also be replaced in part by salt.

*Example IV*

| | Lbs. |
|---|---|
| Phenothiazine | 100 |
| Wheat middlings | 50 |

This mixture is prepared by thoroughly mixing the phenothiazine with the middlings. The ratio can vary from about 1 part by weight of phenothiazine to 0.35 to 0.65 parts or more by weight of middlings. The resulting mixtures or concentrates can be added to ordinary feed rations, or be mixed with molasses as in Example III, or be mixed with a mixture of molasses and salt as in Example I and II to provide mixtures for curative and preventive treatments. The ratio of molasses to middlings can vary from about 1 part by weight of middlings to 0.5 to 1.5 parts or more by weight of molasses although a ratio of approximately 1:1 is generally in the preferred range. The ratio of phenothiazine to salt can vary from about 1 part by weight of phenothiazine to 5–15 parts or more by weight of salt with a 1:9 ratio illustrated by Examples I and II being generally preferred. The use of less than 25% middlings based on the phenothiazine results in compositions objectionable to the animal and the use of more than 40% middlings based on the phenothiazine results in no substantial overall improvement. For most purposes the use of mixtures containing about 33% middlings based on the phenothiazine (as in Example I) is adequate for desired results.

The phenothiazine used in the present invention should be substantially free from toxic impurities and can be any of the commercially available types employed in the control of worms such as the Eastern and Western stomach worms, in animals. The wheat middlings used in the present invention can be any of the commercially available types such as, for example, standard or flour middlings. See Northwestern Miller, Almanac Edition, p. 107 (May 1957). The middlings are obtained from the same part of the grain, differing primarily in fiber content. A highly refined middling from the aleurone fraction of the wheat berry and with a low fiber content can also be employed in the present invention. The molasses used in the present invention can be any of the commercially available products such as cane sugar molasses, blackstrap molasses, beet sugar molasses, or like sugar mixtures. The salt used is preferably of the commercially available trace-mineralized type.

During the investigations in this field it was also found that a mixture containing about 50–90% of molasses carried on beet pulp (sugar beet residue after extraction of the beet sugar) could be used in place of grain middlings. An illustrative composition contains 9 parts of salt, 1 part of phenothiazine and 1 part of a dry mixture made up of about 80% of beet sugar molasses and 20% beet pulp. (All parts by weight.) The mixtures containing wheat middlings, however, proved generally to be superior and accordingly preferred.

It is not known why or how the middlings or beet pulp make the phenothiazine more palatable and therefore more acceptable to animals. It is possible that the middlings and beet pulp mask the unpleasant taste of phenothiazine, although as it applies to ruminants it appears that it must also destroy the "after taste" of the phenothiazine in these cud-chewing animals. In comparative tests with cattle using salt as the control with the amount of control consumed valued as 100%, and mixture (A) containing 1 part by weight of phenothiazine, 1 part by weight of molasses and 9 parts by weight of salt and mixture (B) containing 1 part by weight of phenothiazine, 1 part by weight of about a 50/50 mixture of molasses and wheat middlings and 9 parts by weight of salt (the composition of Example II), it was found that about 100% of mixture (B) and only about 50% of mixture (A) were consumed compared to the control. This illustrative test shows dramatically the value of the middlings in phenothiazine compositions fed to ruminants.

I claim:
1. A composition consisting essentially of about 1 part of phenothiazine, 1 part of a mixture of wheat middlings and molasses containing about 45–55% of wheat middlings, and about 9 parts of salt.
2. An anthelmintic composition consisting essentially of phenothiazine, wheat middlings, molasses and salt, in which the ratio by weight of phenothiazine to the wheat middlings is about 1:0.35–0.65; the ratio by weight of the wheat middlings to the molasses is about 1:0.5–1.5; and the radio by weight of the phenothiazine to the salt is about 1:5–15.

References Cited in the file of this patent
OTHER REFERENCES

McCulloch: J.A.V.M.A., Aug. 1942, pp. 114, 117–119.
Morrison: Feeds and Feeding, 1951, pp. 508, and 509, Morrison Publ. Co., Ithaca, N.Y.
Habermann: The North American Veterinarian, May 1942, pages 318–321.
Cauthen: Flour and Feed, Dec. 1955, pp. 7 and 8.